United States Patent [19]

Nakamura et al.

[11] Patent Number: 5,953,172
[45] Date of Patent: Sep. 14, 1999

[54] HIGH SPEED RECORDING AND REPRODUCING APPARATUS FOR AVOIDING CROSS TALK DURING INSERT-RECORDING

[75] Inventors: Kenji Nakamura; Isao Tsutsumi, both of Kanagawa, Japan

[73] Assignee: Sony Corporation, Tokyo, Japan

[21] Appl. No.: 08/732,302

[22] PCT Filed: Mar. 8, 1996

[86] PCT No.: PCT/JP96/00586

§ 371 Date: Feb. 10, 1997

§ 102(e) Date: Feb. 10, 1997

[87] PCT Pub. No.: WO96/28813

PCT Pub. Date: Sep. 19, 1996

[30] Foreign Application Priority Data

Mar. 10, 1995 [JP] Japan ................................. 7-051363

[51] Int. Cl.⁶ .......................... G11B 15/14; G11B 27/00; H04N 5/93
[52] U.S. Cl. ................... 360/64; 386/56; 360/13
[58] Field of Search ................... 386/56, 4, 52; 360/61, 64, 13

[56] References Cited

U.S. PATENT DOCUMENTS

| | | | |
|---|---|---|---|
| 4,520,405 | 5/1985 | Sasaki et al. | 360/66 |
| 4,796,105 | 1/1989 | Mawatari | 360/64 |
| 5,136,437 | 8/1992 | Tabuchi et al. | 360/64 |
| 5,293,277 | 3/1994 | Shimazaki et al. | 360/64 |
| 5,361,178 | 11/1994 | Tanaka | 360/64 |
| 5,646,806 | 7/1997 | Griffith et al. | 360/130.21 |

FOREIGN PATENT DOCUMENTS

| | | |
|---|---|---|
| 3-187011 | 8/1991 | Japan . |
| 4-67311 | 3/1992 | Japan . |

*Primary Examiner*—Aristotelis M. Psitos
*Assistant Examiner*—Regina Y. Neal
*Attorney, Agent, or Firm*—Frommer Lawrence & Haug, LLP; William S. Frommer

[57] ABSTRACT

In a digital VTR to which this invention is applied, recording heads 51*a*, 51*b*, reproduction heads 52*a*, 52*b* and an erase head 53 are disposed on a rotary drum 50 so that the recording heads 51*a*, 51*b* and the erase head 53 do not scan tracks for a time period during which the reproduction heads 52*a*, 52*b* are scanning tracking areas 2 and speech areas 3. In the case where, e.g., speech signal of channel #1 is insert-recorded, an approach is employed to separate, at a reproduction signal processing circuit 67, speech signal of channel #2 of interleaved speech signals reproduced by the reproduction heads 52*a*, 52*b* to deliver it to a recording signal processing circuit 46 through a selector switch 45*b*. Further, the speech signal of the channel #2 and new speech signal of the channel #1 delivered through a terminal 42*a* are interleaved by the recording signal processing circuit 46 to record such interleaved signals into the speech areas 3 by the recording heads 51*a*, 51*b*. Thus, it can be prevented that crosstalk of recording current or erase current takes place in reproduction signal corresponding to speech signal. As a result, insert-recording of speech signal can be securely carried out. Namely, in this digital VTR, there is no degradation of S/N of reproduction signal resulting from crosstalk of the recording signal or the erase current, and a speech signal of a certain channel of plural channels can be insert-recorded.

15 Claims, 7 Drawing Sheets

HIGH SPEED RECORDING AND REPRODUCING APPARATUS FOR AVOIDING CROSS TALK DURING INSERT-RECORDING

TECHNICAL FIELD

This invention relates to a recording and reproducing apparatus, and more particularly to a recording and reproducing apparatus adapted for recording video signals and speech signals (audio signals) of plural channels by using the so-called rotary head, onto a recording medium, e.g., magnetic tape after undergone conversion into digital signals, and for reproducing the video signals and the speech signals (audio signals) thus recorded.

BACKGROUND ART

Because the picture quality is not deteriorated in the digital VTR even if editing/dubbing, etc. is repeated, industrial digital VTRs are used in, e.g., the broadcasting station. In addition, appearance of digital VTR for civil use which can be used even in general home is expected.

Figure 1:
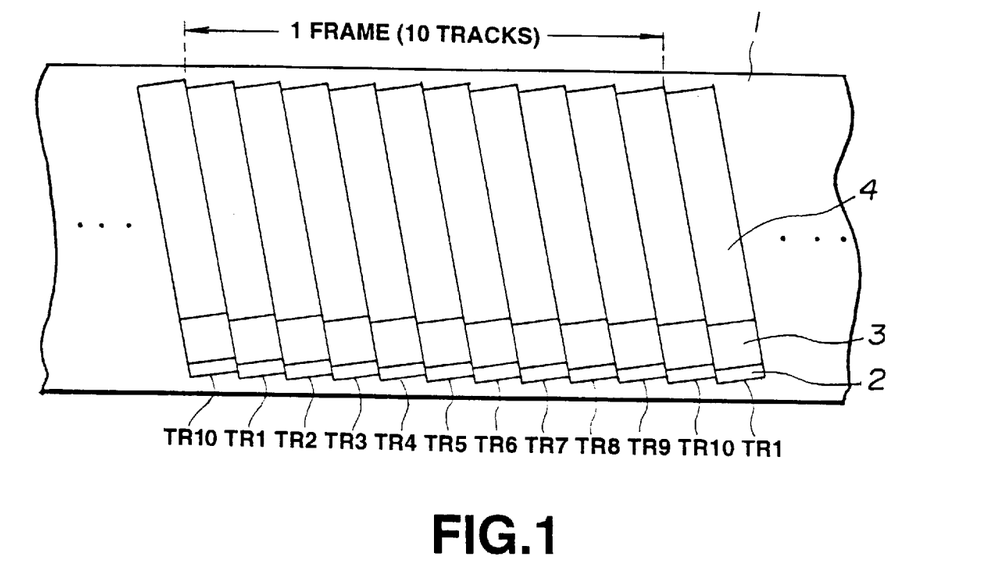
FIG. 1 is a view showing the recording format of a digital VTR.

In the home digital VTR, the recording format having track pattern on a magnetic tape 1 as shown in FIG. 1 has been proposed.

Namely, in this recording format, video signals of one frame and four channels (hereinafter referred to as channels #1, #2, #3, #4) of speech signals (audio signals) of one frame are converted into digital signals, and those digital signals are recorded by the helical system into 10 tracks TR1, TR2, TR3, TR4, TR5, TR6, TR7, TR8, TR9, TR10. More particularly, tracking signals for correctly tracking the head, speech signals and video signals are converted into digital signals, and they are respectively recorded into tracking areas 2, speech areas 3, and video areas 4 of respective tracks. In this case, respective speech signals of the channels #1, #2 are recorded into the speech areas 3 of the track TR1~the track TR5 after undergone interleaving, and respective speech signals of the channels #3, #4 are recorded into the speech areas 3 of the track TR6~the track TR10 after undergone interleaving.

Figure 2:
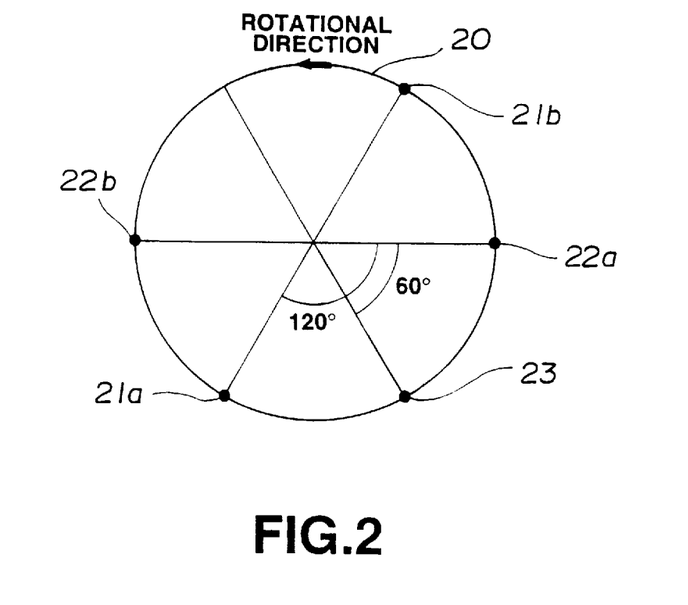
FIG. 2 is a view showing the positional relationship of respective heads on rotary drum used in a conventional digital VTR.

In correspondence with such a recording format, as shown in FIG. 2, reproduction heads 22a, 22b of 2 channels are oppositely provided on the outer circumference of a rotary drum 20 of the digital VTR, wherein a recording head 21b is disposed at the position rotated by 60 degrees in the counterclockwise direction with respect to the reproduction head 22a, and a recording head 21a is disposed at the position opposite to the recording head 21b. Accordingly, the recording head 21a and the reproduction head 22a are spaced therebetween in terms of angle by 120 degrees. An erase (erasing) head 23 is disposed at the position rotated by 60 degrees in the clockwise direction from the reproduction head 22a between the recording head 21a and the reproduction head 22a.

When the rotary drum 20 makes one round, video signal and speech signal of one track are recorded onto the recording tape 1 one after another by the recording heads 21a, 21b. Accordingly, when the rotary drum 20 makes five rounds, video signals and speech signals of 10 tracks in total, i.e., 1 frame are recorded onto the magnetic tape 1.

On the other hand, also at the time of reproduction, similarly to the operation at the time of recording, for a time period during which the rotary drum 20 makes five rounds, video signals and speech signals of one frame (10 tracks) are reproduced from the magnetic tape 1.

Figure 3:
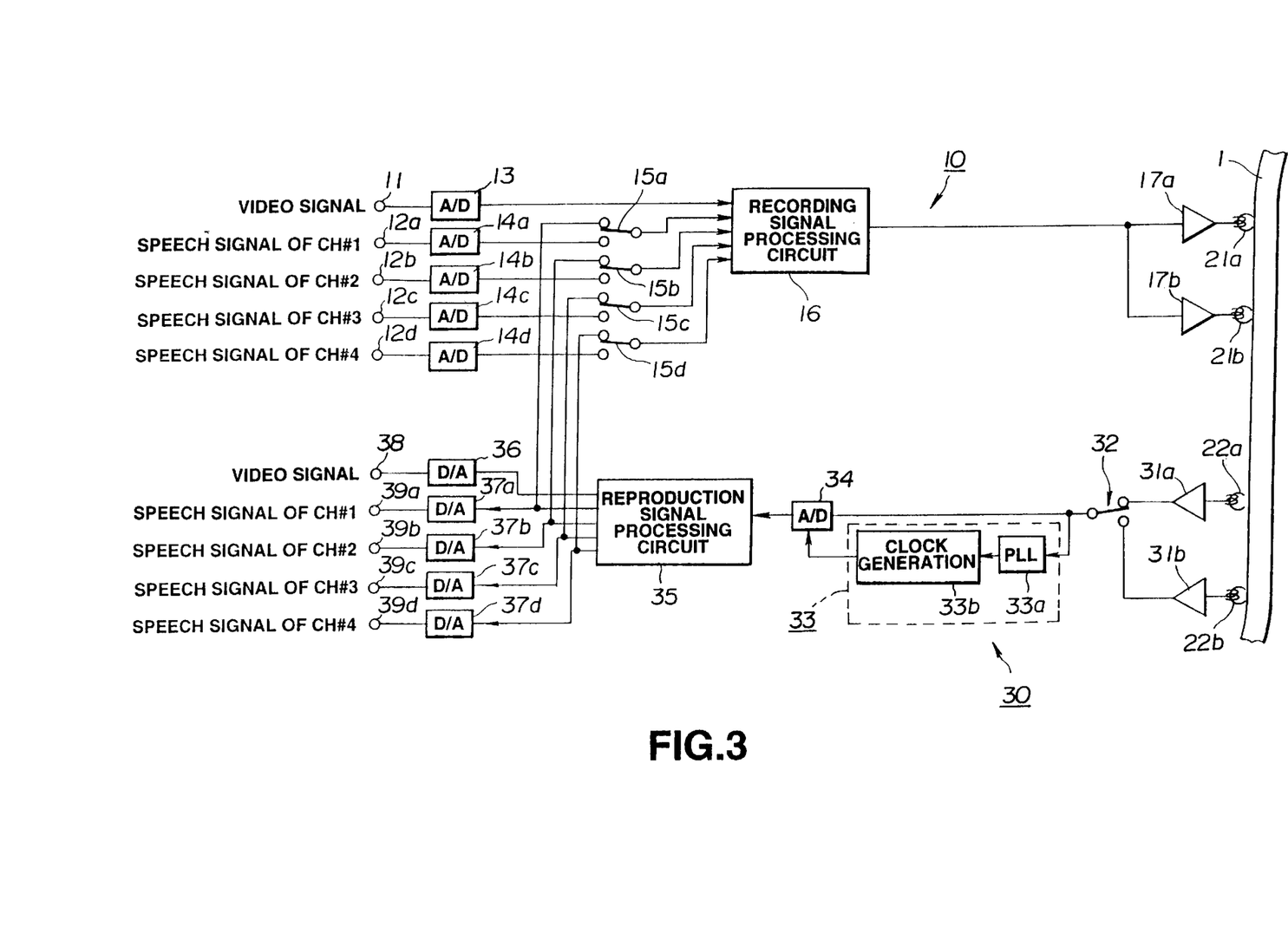
FIG. 3 is a block diagram showing the configuration of the conventional digital VTR.

A digital VTR adapted for carrying out such a recording/reproduction includes a recording system 10 and a reproduction system 30 as shown in FIG. 3.

This recording system 10 comprises an A/D converter 13 for converting a video signal into a digital signal, A/D converters 14a, 14b, 14c, 14d for respectively converting speech signals of 4 channels into digital signals, selector (changeover) switches 15a, 15b, 15c, 15d for respectively carrying out selective switching between respective speech data from the A/D converters 14a~14d and respective speech data from a reproduction signal processing circuit 35 which will be described later, a recording signal processing circuit 16 for implementing a predetermined signal processing to video data from the A/D converter 13 and respective speech data selected at the selector switches 15a~15d, recording amplifiers 17a, 17b for amplifying a recording signal from the recording signal processing circuit 16, and recording heads 21a, 21b for recording recording signals from the recording amplifiers 17a, 17b.

More particularly, the A/D converter 13 converts a video signal delivered through a terminal 11 into a digital signal to deliver video data thus obtained to the recording signal processing circuit 16. On the other hand, the A/D converters 14a~14d convert respective speech signals of the channels #1~#4 respectively delivered through terminals 12a, 12b, 12c, 12d into digital signals to deliver speech data of respective channels thus obtained to the recording signal processing circuit 16 through the selector switches 15a~15d.

The recording signal processing circuit 16 implements a predetermined signal processing, e.g., encoding (modulation) based on a predetermined encoding (modulation) rule for data compression, and/or addition of error correction code for error correction at the reproduction system 30, etc. to the video data delivered from the A/D converter 13. Moreover, the recording signal processing circuit 16 implements a predetermined signal processing such as encoding, etc. to speech data of the channels #1~#4 respectively delivered through the selector switches 15a~15d. Further, the recording signal processing circuit 16 interleaves respective speech data of the channels #1, #2, and interleaves respective speech data of the channels #3, #4 so that the so-called burst error does not takes place in speech data reproduced at the reproduction system 30 to add error correction codes thereto. In addition, the recording signal processing circuit 16 carries out time-divisional multiplexing of the video data and the speech data to which the predetermined signal processing have been implemented so as to become in conformity with the above-described recording format. Namely, the recording signal processing circuit 16 carries out time-divisional multiplexing of video data and speech data so that video data of one frame are recorded into the video areas 4 of the tracks TR1~TR10, the interleaved speech data of the channels #1, #2 are recorded into the speech areas 3 of the tracks TR1~TR5, and the interleaved speech data of the channels #3, #4 are recorded into the speech areas 3 of the tracks TR6~TR10 to deliver a recording signal thus obtained to the recording amplifiers 17a, 17b. The recording amplifiers 17a, 17b amplify the recording signal to drive the recording heads 21a, 21b. More particularly, the recording head 21a scans, e.g., tracks TR1, TR3, TR5 . . . , and the recording head 21b scans tracks TR2, TR4, TR6 . . . to carry out recording based on the recording signals. Thus, video signals of one frame and 4 channels of speech signals of one frame are recorded into 10 tracks TR1~TR10 on the magnetic tape 1, as shown in the FIG. 1 mentioned above, by the recording heads 21a, 21b.

On the other hand, as shown in the FIG. 3 mentioned above, the reproduction system 30 comprises reproduction heads 22a, 22b, equalizer amplifiers 31a, 31b for respectively carrying out waveform equalization of respective reproduction signals from the reproduction heads 22a, 22b, a selector (changeover) switch 32 for carrying out selective switching between respective reproduction signals which have been waveform-equalized by the equalizer amplifiers 31a, 31b, a clock reproduction circuit 33 for reproducing a clock (clock signal) from the reproduction signal selected at the selector switch 32, an A/D converter 34 for allowing the reproduction signal selected at the selector switch 32 to be binary signal (i.e., binarizing the reproduction signal) to output reproduction data, a reproduction signal processing circuit 35 for separating video data and speech data of 4 channels from the reproduction data from the A/D converter 34, a D/A converter 36 for converting the video data from the reproduction signal processing circuit 35 into an analog signal, and D/A converters 37a, 37b, 37c, 37d for respectively converting the speech data of 4 channels from the reproduction signal processing circuit 35 into analog signals.

More particularly, the clock reproduction circuit 33 comprises a PLL circuit 33a for reproducing clock on the basis of reproduction signal selected at the selector switch 32, and a sampling clock generating circuit 33b for generating a sampling clock of the A/D converter 34 from the clock from the PLL circuit 33a.

Figure 4A:
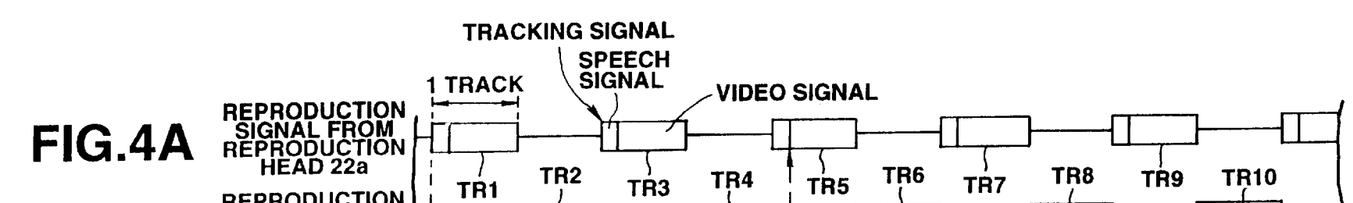
FIGS. 4A, 4B, 4C, 4D, 4E, 4F are time charts showing the relationship between recording signal and reproduction signal in the conventional digital VTR.
Figures 4B, 4C:
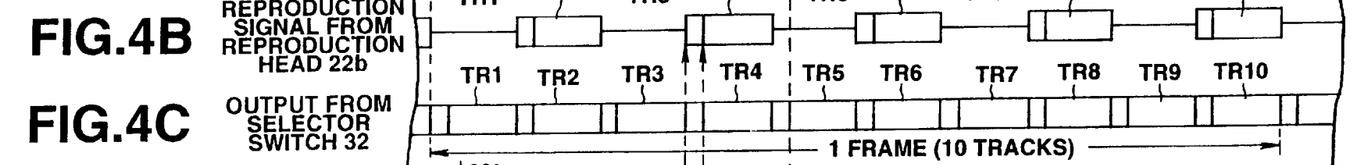

Moreover, the reproduction heads 22a, 22b scan, one after another, tracks on the magnetic tape 1 in accordance with rotation of the rotary drum 20. Thus, the reproduction head 22a and the reproduction head 22b alternately output reproduction signals in such a manner that the former head 22a outputs reproduction signals corresponding to the tracks TR1, TR3, TR5 . . . as shown in FIG. 4A, and the latter head 22b outputs reproduction signals corresponding to the tracks TR2, TR4, TR6 . . . The equalizer amplifiers 31a, 31b carry out waveform equalization and amplification of these reproduction signals. In addition, the selector switch 32 is operative as shown in FIG. 4C to alternately select waveform-equalized reproduction signals to deliver a continuous reproduction signal to the PLL circuit 33a and the A/D converter 34.

The PLL circuit 33a generates a reproduction clock in synchronism with the clock component superimposed on the reproduction signal delivered through the selector switch 32. The sampling clock generating circuit 33b generates a sampling clock from the reproduction clock to deliver it to the A/D converter 34.

The A/D converter 34 converts reproduction signal delivered through the selector switch 32 into digital signal on the basis of the sampling clock delivered from the sampling clock generating circuit 33b so that the reproduction signal is binarized to deliver the reproduction data thus obtained to the reproduction signal processing circuit 35.

The reproduction signal processing circuit 35 decodes (demodulates) reproduction data delivered from the A/D converter 34 in correspondence with a predetermined signal processing at the recording system 10, and carries out error correction and de-interleaving to conduct separation of the video data and the speech data of 4 channels. Then, the reproduction signal processing circuit 35 delivers the video data to the D/A converter 36, and delivers the speech data of the channels #1~#4 to the D/A converters 37a~37d, respectively. The D/A converter 36 converts the video data into an analog signal to output the video signal thus obtained through a terminal 38. In addition, the D/A converters 37a~37d respectively convert speech data of the respective channels into analog signals to output respective speech signals thus obtained through terminals 39a, 39b, 39c, 39d.

In the above-described digital VTR, in, e.g., editing, etc., there are instances where speech signal of a certain channel is recorded in the state where it is inserted. In the above-described recording format of the digital VTR, the speech signals of the channels #1, #2 of the speech signals of 4 channels are recorded into the tracks TR1~TR5 after undergone interleaving, and the speech signals of the channels #3, #4 are recorded into the tracks TR6~TR10 after undergone interleaving. For this reason, in the case where, e.g., only the speech signal of the channel #1 is insert-recorded, the speech signal of the remaining channel #2 within the same tracks TR1~TR5 must be left as it is. Accordingly, the speech signal of the channel #2 reproduced by the reproduction heads 22a, 22b is sent to the recording system 10 for a second time, and is recorded into the tracks TR1~TR5 after it is interleaved with a speech signal of the channel #1 delivered through the terminal 12a.

In more practical sense, the speech signal of the channel #1 delivered through the terminal 12a is converted into speech data at the A/D converter 14a to set the selector switches 15a, 15b so that the selector switch 15a selects speech data from the A/D converter 14a and the selector switch 15b selects the reproduced speech data of the channel #2 from the reproduction signal processing circuit 35. In addition, the recording signal processing circuit 16 interleaves new speech data of the channel #1 selected by the selector switch 15a and the speech data of the channel #2 selected by the selector switch 15b, and implements a predetermined signal processing such as addition of error correction code, etc. to generate a recording signal with respect to the speech areas 3 of the tracks TR1~TR5 to deliver this recording signal to the recording heads 21a, 21b through the recording amplifiers 17a, 17b.

Figure 4D:
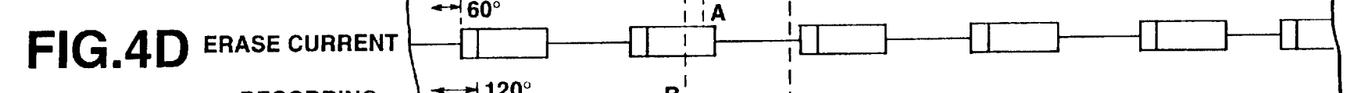
Figure 4E:
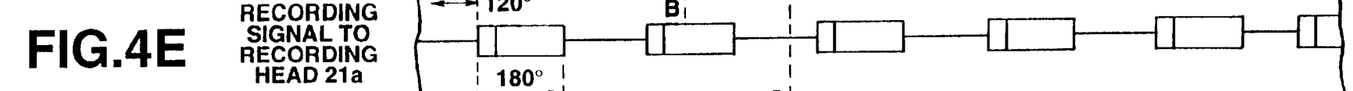
Figure 4F:
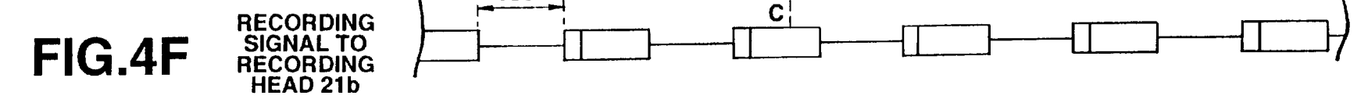

Here, as shown in the FIG. 2 mentioned above, since rotation angles of the recording heads 21a, 21b are delayed (shifted) by 120 degrees with respect to the reproduction heads 22a, 22b, the recording signal delivered to the recording heads 21a, 21b is delayed by the time corresponding to 120 degrees in terms of the rotation angle of the rotary drum 20 with respect to the reproduction signal from the reproduction heads 22a, 22b as shown in FIGS. 4E, 4F. Moreover, at this time, as shown in FIG. 4D, erase current is delivered to the erase head 23 in a manner preceding by the time corresponding to 60 degrees in terms of the rotation angle of the rotary drum 20 with respect to (supply of) recording signal to the recording head 21a. Thus, the speech signal of the channel #1 is insert-recorded into the tracks TR1~TR5. It is to be noted that, in practice, reproduction signal reproduced by the reproduction heads 22a, 22b from the magnetic tape 1 is delayed by, e.g., about (1+⅓) frames by the reproduction signal processing circuit 35, etc., and is further delayed by about (1+⅓) frames by the recording signal processing circuit 16, whereby the reproduction signal is recorded onto the magnetic tape 1 in the state delayed by about (2+⅔) frames in total. In addition, since the speech signals of the channels #3, #4 are only reproduced, setting of the selector switches 15c, 15d has not relevancy to the above-described operation. In this example, however, those switches are assumed to be switched so as to select speech data from the reproduction signal processing circuit 35.

Meanwhile, the level of the reproduction signal outputted from the reproduction heads 22a, 22b is $1/1000$~10000 of recording signal delivered to the recording heads 21a, 21b or erase current delivered to the erase head 23. The crosstalk of the recording signal or erase current with respect to the reproduction signal becomes problem. Namely, in the case where video signals and speech signals are simply recorded, or video signals and speech signals are simply reproduced, there is no problem. However, in the case where speech signal of a certain channel is insert-recorded as described above, since erasing or recording operation is carried out when the reproduction heads 22a, 22b are scanning the speech areas 3, the recording signal (designated at B, C in FIG. 4) or erase current (designated at A in FIG. 4) leaks into reproduction signal of speech signal, leading to deterioration of the signal-to-noise ratio (so called S/N ratio) of the reproduction signal. As a result, error rate is lowered. Further, in the case where crosstalk is large, it becomes impossible to correctly reproduce the video signal and/or the speech signal from the magnetic tape 1. In other words, in the conventional digital VTR, in the worst case, the speech signal of the channel #1 would be unable to be insert-recorded in the state where, e.g., the speech signal of the channel #2 is held on the magnetic tape 1.

This invention has been made in view of actual circumstances as described above, and its object is to provide a recording and reproduction apparatus in which, in insert-recording a speech signal of a certain channel, a measure can be taken such that the crosstalk of a recording signal of a channel which is to be insert-recorded does not affect reproduction signal of speech signal of channels recorded as they are.

DISCLOSURE OF THE INVENTION

In order to solve the above-described problems, the recording and reproducing apparatus according to this invention includes a recording head for recording a first signal into first areas of respective tracks on a recording medium, and for recording a second signal into second areas succeeding to the first areas of the respective tracks on the recording medium, and a reproduction head for reproducing the first signal and the second signal from the tracks. In addition, the recording and reproducing apparatus is such that, in order that crosstalk of recording signal delivered to the recording head does not take place with respect to reproduction signal corresponding to the first area from the reproduction head, the recording head and the reproduction head are disposed so that the recording head does not scan the tracks for a time period during which the reproduction head is scanning the first areas.

BEST MODE FOR CARRYING OUT THE INVENTION

Preferred embodiment of a recording and reproducing apparatus according to this invention will now be described with reference to the attached drawings. In this embodiment, the recording and reproducing apparatus according to this invention is applied to a digital VTR for civil use.

This digital VTR is adapted to record video signals and speech (audio) signals of plural channels onto a magnetic tape in accordance with the helical system by the so-called rotary head, and to reproduce the video signals and the speech signals of the plural channels recorded on the magnetic tape. Moreover, in this digital VTR, the recording format described in the background art (FIG. 1) is assumed to be employed as the recording format on the magnetic tape. Namely, video signals of one frame, and 4 channels (hereinafter referred to as #1, #2, #3, #4) of speech signals (audio signals) of one frame are recorded into ten tracks TR1, TR2, TR3, TR4, TR5, TR6, TR7, TR8, TR9, TR10 in accordance with the helical system. More particularly, tracking signals for correctly tracking the head, speech signals and video signals are converted into digital signals, and those signals are respectively recorded into tracking areas 2, speech areas 3, and video areas 4 of the respective tracks. Further, respective speech signals of the channels #1 and #2 are recorded into the speech areas 3 of the track TR1~the track TR5 after undergone the so-called interleaving, and respective speech signals of the channels #3 and #4 are recorded into the speech areas 3 of the track TR6~the track TR10 after undergone interleaving. In addition, in this digital VTR, a scheme is employed such that, in, e.g., editing, etc., video signals and speech signals of arbitrary (certain) channels recorded on the magnetic tape are left as they are, thus making it possible to record speech signal of at least one channel in the state where it is inserted.

The rotary head used in this digital VTR will now be described.

Figure 5:
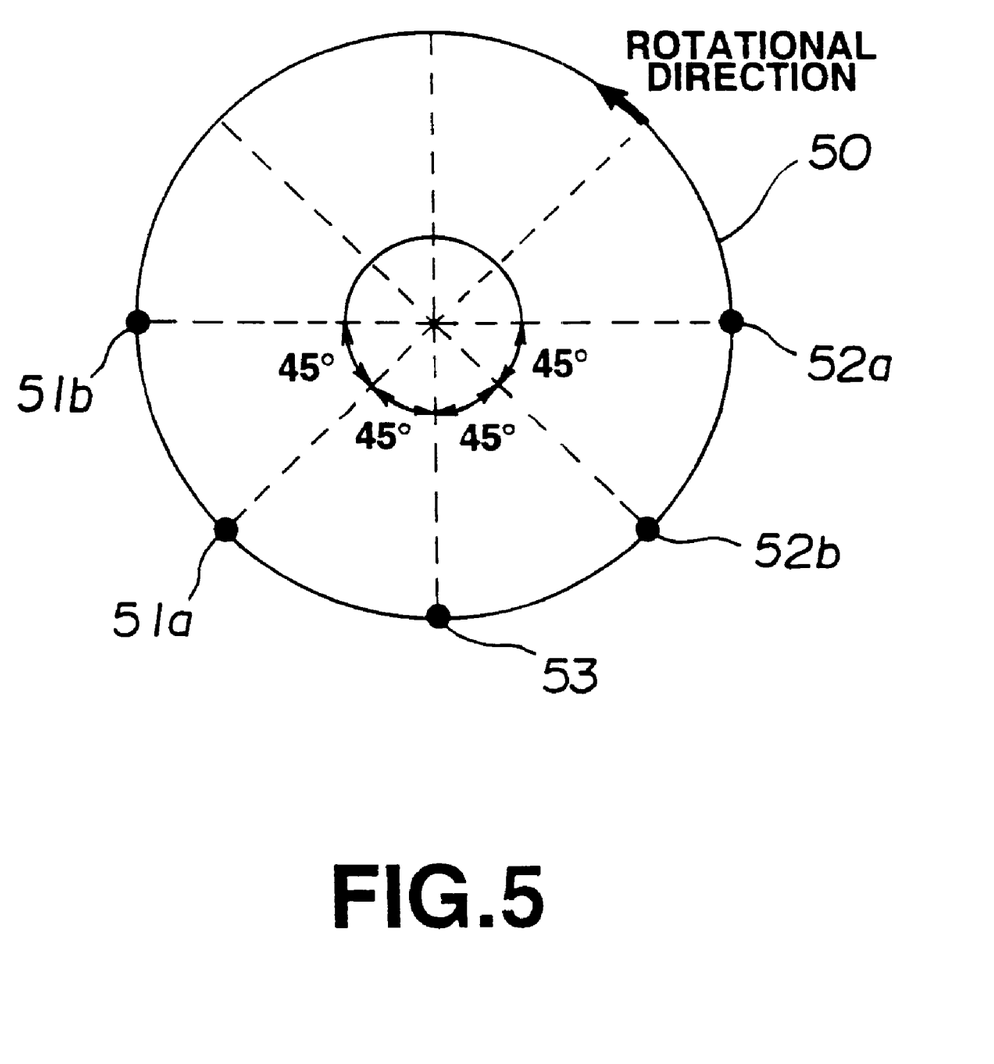
FIG. 5 is a view showing the positional relationship of respective heads on rotary drum used in a digital VTR to which this invention is applied.

The digital VTR includes a rotary drum 50 on which the magnetic tape is wound as shown in FIG. 5, for example. On the outer circumference of the rotary drum 50, e.g., two reproduction heads 52a, 52b, one erase (erasing) head 53, and, e.g., two recording heads 51a, 51b are disposed so that the recording heads 51a, 51b and the erase head 53 do not scan tracks for a time period during which the reproduction heads 52a, 52b are scanning the speech areas 3 on the tracks.

In more practical sense, when it is assumed that, e.g., the above-described tracking area 2 and speech area 3 have length on the track corresponding to about 30 degrees of the rotary drum 50, the reproduction head 52a, the reproduction head 52b, the erase head 53, the recording head 51a and the recording head 51b are disposed, in the state where they have angle of about 45 degrees relative to each other, in order recited in the rotational direction of the rotary drum 50, within the angular range of one 180 degrees which is one half of circumference of the rotary drum 50.

Figure 6A:
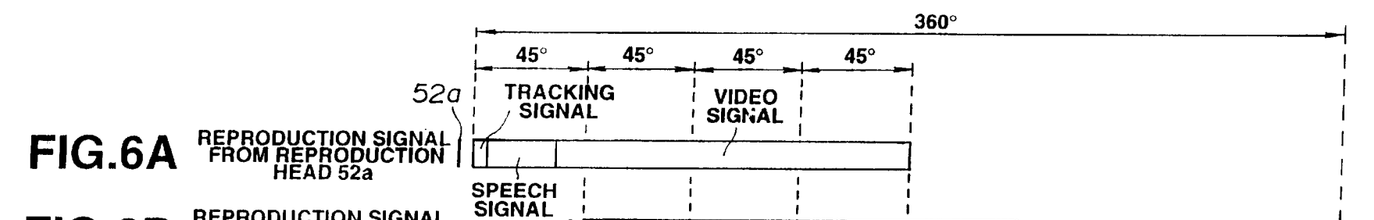
FIGS. 6A, 6B, 6C, 6D, 6E are time charts showing the relationship between recording signal and reproduction signal in the digital VTR to which this invention is applied.
Figures 6B, 6C:
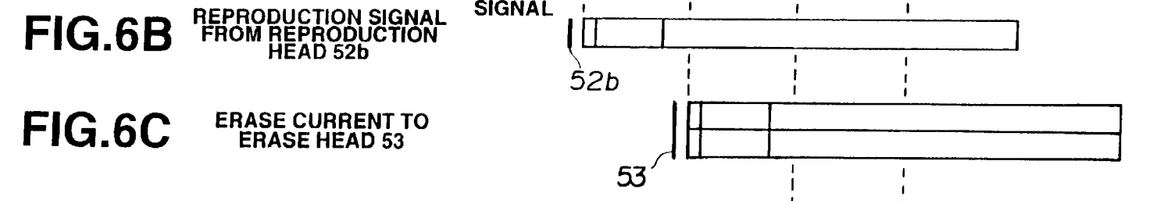

In this example, this rotary drum 50 is rotated in the counterclockwise direction. Accordingly, the reproduction head 52a scans the tracking area 2, the speech area 3, and the video area 4 of, e.g., track TR1 on the magnetic tape 1 in order recited for a time period corresponding to one half of rotation of the rotary drum 50, i.e., 180 degrees of the rotary drum 50 to output a reproduction signal as shown in FIG. 6A, for example. In addition, the reproduction head 52b starts scanning of the track TR2 in a manner delayed by the time corresponding to 45 degrees in terms of the rotation angle of the rotary drum 50 from the time when the reproduction head 52a starts scanning of the track TR1 to output a reproduction signal as shown in FIG. 6B, for example.

The erase head 53 has, e.g., width twice grater than that of the recording head or the reproduction head, and starts scanning of, e.g. tracks TR1, TR2 at the same time in a manner delayed by the time corresponding to 45 degrees in terms of the rotational angle of the rotary drum 50 from the time when the reproduction head 52b starts scanning of the track TR2. When data recorded on the magnetic tape 1 is erased, or insert-recording is carried out, erase current is caused to flow in the erase head 53, as shown in FIG. 6C, for example, after output of reproduction signal corresponding to the tracking area 2 and the speech area 3 from the reproduction heads 52a, 52b has been completed. Namely, there is no possibility that the erase head 53 may scan the magnetic tape 1 for a time period during which the reproduction heads 52a, 52b are scanning the tracking areas 2 and the speech areas 3.

Figures 6D, 6E:
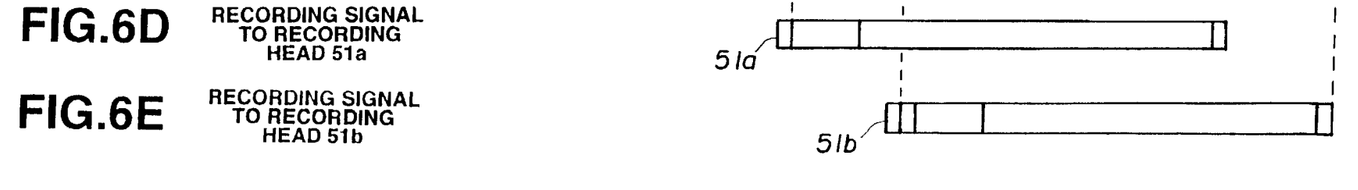

Moreover, since the recording heads 51a, 51b are disposed at positions respectively further spaced in terms of angle by 45 degrees and 90 degrees from the erase head 53, they start scanning of the tracks TR1, TR2 in a manner delayed by the times corresponding to 45 degrees and 90 degrees in terms of the rotational angle of the rotary drum 50 from the start of scanning of the erase head 53. In addition, when recording or insert-recording is carried out, a recording signal (recording current) is caused to flow in these recording heads 51a, 51b as shown in FIGS. 6D, 6E, for example, in a manner delayed by times respectively corresponding to 45 degrees and 90 degrees in terms of the rotational angle of the rotary drum 50 from start of supply of erase current. Namely, there is no possibility that the recording heads 51a, 51b may scan the magnetic tape 1 for a time period during which the reproduction heads 52a, 52b are scanning the tracking areas 2 and the speech areas 3.

The configuration of the digital VTR will now be described.

Figure 7:
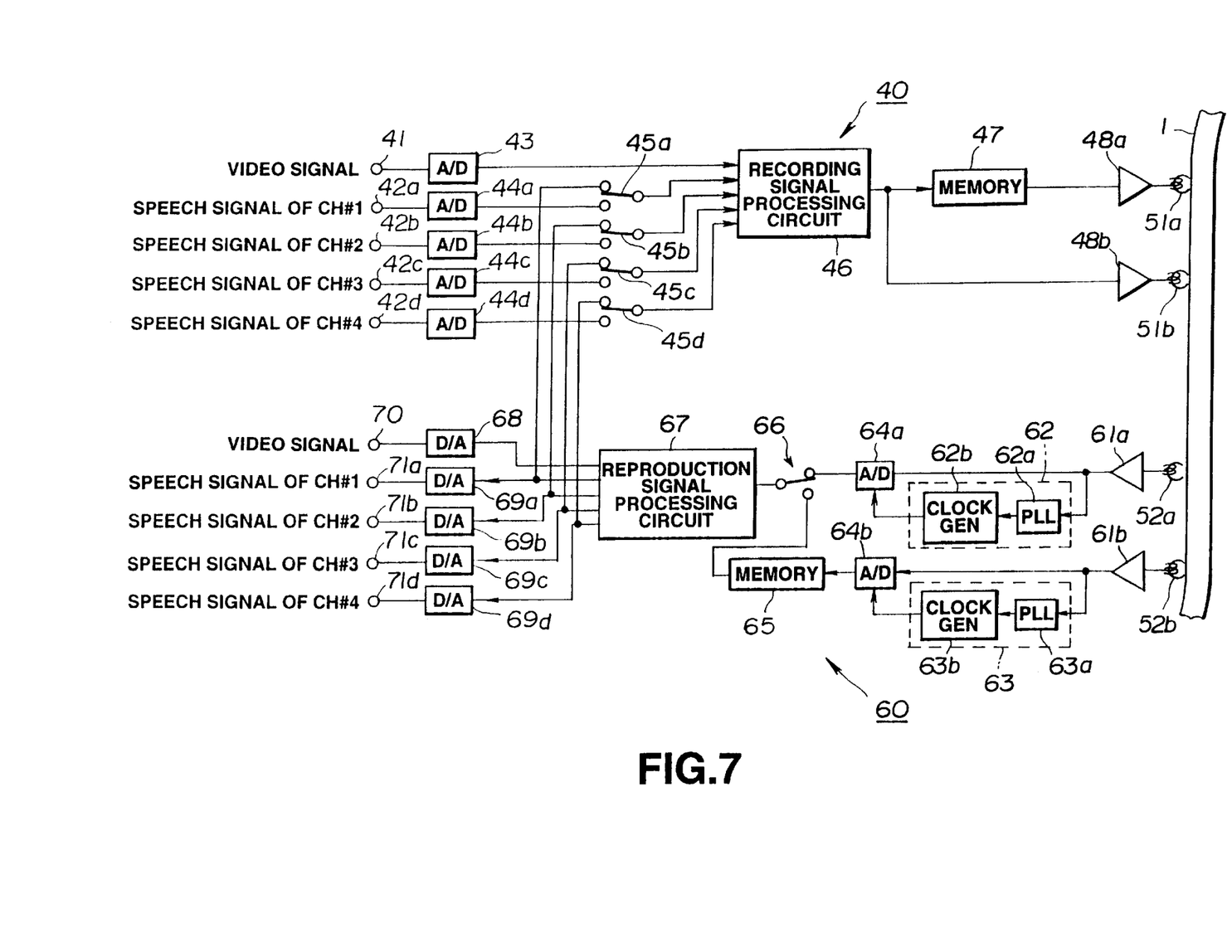
FIG. 7 is a block diagram showing the configuration of the digital VTR to which this invention is applied.

The digital VTR includes a recording system 40 and a reproduction system 60 as shown in FIG. 7, for example.

This recording system 40 comprises an A/D converter 43 for converting a video signal into a digital signal, A/D converters 44a, 44b, 44c, 44d for respectively converting speech signals of 4 channels into digital signals, selector switches 45a, 45b, 45c, 45d for respectively carrying out selective switching between respective speech data from the A/D converters 44a~44d and respective speech data from a reproduction signal processing circuit 67 which will be described later, a recording signal processing circuit 46 for implementing a predetermined signal processing to video data from the A/D converter 43 and respective speech data selected by the selector switches 45a~45d, a memory 47 for delaying, by a predetermined time, recording signal from the recording signal processing circuit 46 delivered to the preceding recording head 51a in the rotational direction of the rotary drum 50, recording amplifiers 48a, 48b for respectively amplifying recording signals from the recording signal processing circuit 46 and the memory 47, and recording heads 51a, 51b for recording signals from the recording amplifiers 48a, 48b.

More particularly, the A/D converter 43 converts a video signal delivered through a terminal 41 into a digital signal to deliver video data thus obtained to the recording signal processing circuit 46. The A/D converters 44a~44d convert respective speech signals of channels #1~#4 respectively delivered through terminals 42a, 42b, 42c, 42d into digital signals to deliver speech data of respective channels thus obtained to the recording signal processing circuit 46 through selector (changeover) switches 45a~45d which will be described later.

The recording signal processing circuit 46 implements a predetermined signal processing, e.g., encoding (modulation) based on a predetermined encoding (or modulation) rule for data compression, and/or addition of error correction code for error correction at the reproduction system 60, etc. to video data delivered from the A/D converter 43. Moreover, the recording signal processing circuit 46 implement a predetermined signal processing such as encoding, etc. to speech data of the channels #1~#4 respectively delivered through the selector switches 45a~45d. In addition, the recording signal processing circuit 46 interleaves respective speech data of the channels #1, #2, and interleaves respective speech data of the channels #3, #4 so that the so-called burst error does not take place in speech data reproduced at the reproduction system 60 to add error correction codes thereto. Further, the recording signal processing circuit 46 carries out time-divisional multiplexing of the video data and the speech data to which the predetermined signal processing have been implemented so as to become in conformity with the above-described recording format to alternately deliver recording data (recording signal) thus obtained to the memory 47 and the recording amplifier 48b every one half of rotation of the rotary drum 50.

Figure 8A:
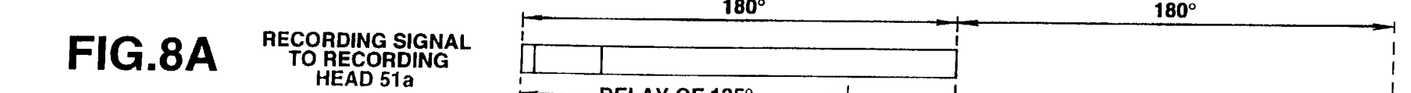
FIGS. 8A, 8B, 8C, 8D, 8E, 8F are time charts showing the relationship between recording signal and reproduction signal in the digital VTR to which this invention is applied.

In more practical sense, as shown in FIG. 8A, for example, the recording signal processing circuit 46 delivers, to the memory 47, for a time period during which the rotary drum 50 is rotated by 180 degrees, recording data in which tracking signal of 1 track (1/10 frames), interleaved speech data of one track of the channel #1 and the channel #2 or interleaved speech data of one track of the channel #3 and the channel #4, and video data of one track with respect to the recording head 51a are caused to undergo time-divisional multiplexing. For the next time period during which the rotary drum 50 is rotated by 180 degrees, the recording signal processing circuit 46 delivers, as shown in FIG. 8C, to the recording head 51b, recording data in which tracking signal, and interleaved speech data and video data of the next one track with respect to the recording head 51b are caused to undergo time-divisional multiplexing. Namely, the recording signal processing circuit 46 alternately outputs recording data with respect to the recording head 51a and the recording head 51b every one half of rotation of the rotary drum 50 similarly to the conventional digital VTR in which the recording heads are disposed on the rotary drum in a manner opposite to each other by 180 degrees. In other words, in this digital VTR, the circuits preceding to the recording signal processing circuit 46 are permitted to have the same configuration as the conventional digital VTR.

Figure 8B:
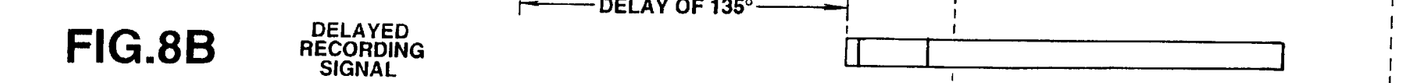
Figure 8C:
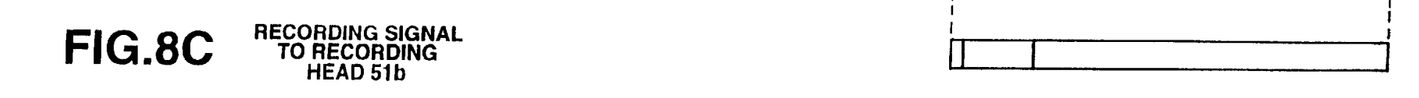

The memory 47 temporarily stores the recording data to thereby delay, by the time corresponding to 135 degrees in terms of the rotation angle of the rotary drum 50, as shown in FIG. 8B, recording data with respect to the recording head 51a delivered from the recording signal processing circuit 46 to deliver it to the recording amplifier 48a. Namely, the time difference between recording data with respect to the recording head 51a and recording data with respect to the recording head 51b outputted from the recording signal processing circuit 46 is equal to 180 degrees in terms of the rotation angle of the rotary drum 50 as shown in the FIGS. 8A, 8C mentioned above. In this case, because the angular interval (distance) between the recording heads 51a, 51b on the rotary drum 50 is equal to 45 degrees in this digital VTR, an approach is employed in which the memory 47 is provided to delay recording data with respect to the preceding recording head 51a in the rotational direction of the rotary drum 50 to generate recording data in conformity with the arrangement of the recording heads 51a, 51b.

The recording amplifiers 48a, 48b respectively amplify recording data (recording signal) delivered from the recording signal processing circuit 46 and recording data delayed at the memory 47 to drive the recording heads 51a, 51b.

The recording head 51a scans, e.g., tracks TR1, TR3, TR5 . . ., and the recording head 51b scans tracks TR2, TR4, TR6 . . . . They carry out recording based on the respective recording signals. Thus, as shown in the FIG. 1 mentioned above, tracking signals are recorded into the tracking areas 2 of respective tracks on the magnetic tape 1, interleaved speech data of the channels #1, #2 are recorded into the speech areas 3 of the tracks TR1 ~TR5, interleaved speech data of the channels #3, #4 are recorded into the speech areas 3 of the tracks TR6~TR10, and video data of one frame are recorded into the video areas 4 of the tracks TR1~TR10.

On the other hand, the reproduction system 60 comprises, as shown in FIG. 7 mentioned above, reproduction heads 52a, 52b, equalizer amplifiers 61a, 61b for respectively carrying out waveform equalization of respective reproduction signals from the reproduction heads 52a, 52b, clock reproduction circuits 62, 63 for respectively reproducing clocks (clock signals) from reproduction signals which have been waveform-equalized by the equalizer amplifiers 61a, 61b, A/D converters 64a, 64b for respectively binarizing the reproduction signals which have been waveform-equalized by the equalizer amplifiers 61a, 61b to output reproduction data, a memory 65 for delaying, by a predetermined time, the reproduction data from the A/D converter 64b reproduced by the succeeding reproduction head 52a in the rotational direction of the rotary drum 50, a selector (changeover) switch 66 for carrying out selective switching between the reproduction data from the A/D converter 64a and reproduction data from the memory 65, a reproduction signal processing circuit 67 for separating video data and speech data of 4 channels from reproduction data selected at the selector switch 66, a D/A converter 68 for converting video data from the reproduction signal processing circuit 67 into an analog signal, and D/A converters 69a, 69b, 69c, 69d for respectively converting speech data of 4 channels from the reproduction signal processing circuit 67 into analog signals.

Figure 8D:
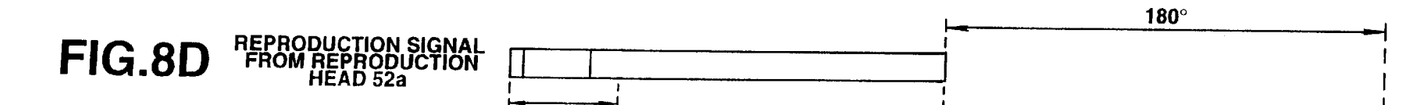
Figures 8E, 8F:
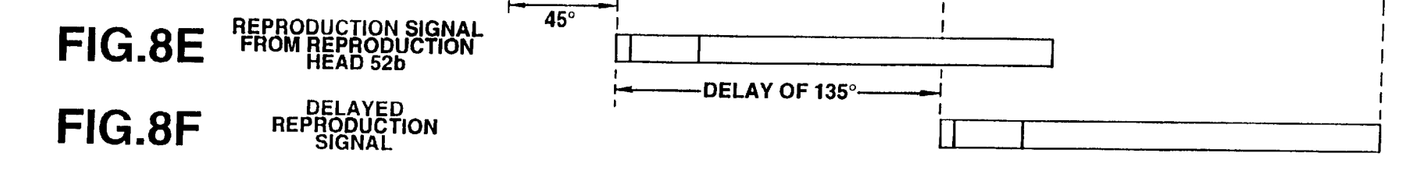

More particularly, the reproduction heads 52a, 52b alternately scan tracks on the magnetic tape 1 in accordance with rotation of the rotary drum 50. Namely, the reproduction head 52a outputs reproduction signals corresponding to tracks TR1, TR3, TR5 . . . as shown in FIG. 8D, for example. Since the reproduction head 52b is disposed at the position succeeding by 45 degrees in the rotational direction of the rotary drum 50 with respect to the reproduction head 52a as described above, the reproduction head 52b outputs reproduction signals corresponding to tracks TR2, TR4, TR6 . . . in a manner delayed by the time corresponding to 45 degrees in terms of the rotational angle of the rotary drum 50 from the start of output of reproduction signal of the reproduction head 52a as shown in FIG. 8E, for example. Namely, the reproduction signal from the reproduction head 52a and the reproduction signal from the reproduction head 52b are outputted in such a manner that they overlap with each other by 135 degrees in terms of the rotational angle of the rotary drum 50 on the time axis.

The equalizer amplifiers 61a, 61b respectively carry out waveform equalization and amplification of respective reproduction signals delivered from the reproduction heads 52a, 52b to deliver the waveform-equalized reproduction signals to the clock reproduction circuits 62, 63.

The clock reproduction circuit 62 comprises, as shown in the FIG. 7 mentioned above, a PLL circuit 62a for reproducing a clock on the basis of reproduction signal from the equalizer amplifier 61a, and a sampling clock generating circuit 62b for generating a sampling clock of the A/D converter 64a from the clock from the PLL circuit 62a. In addition, the clock reproduction circuit 63 comprises a PLL circuit 63a for reproducing a clock on the basis of the reproduction signal from the equalizer amplifier 61b, and a sampling clock generating circuit 63b for generating a sampling clock of the A/D converter 64b from the clock from the PLL circuit 63a.

The PLL circuit 62a generates a reproduction clock in synchronism with the clock component superimposed on the reproduction signal delivered from the equalizer amplifier 61a, and the sampling clock generating circuit 62b generates a sampling clock from the reproduction clock to deliver it to the A/D converter 64a. Moreover, the PLL circuit 63a generates a reproduction clock in synchronism with the clock component superimposed on the reproduction signal delivered from the equalizer amplifier 61b, and the sampling clock generating circuit 63b generates a sampling clock from the reproduction clock to deliver it to the A/D converter 64b.

The A/D converter 64a converts the reproduction signal delivered from the equalizer amplifier 61a into a digital signal on the basis of the sampling clock delivered from the sampling clock generating circuit 62b so that the reproduction signal is binarized to deliver reproduction data thus obtained to the selector switch 66. Similarly, the A/D converter 64b converts reproduction signal delivered from the equalizer amplifier 61b into a digital signal on the basis of the sampling clock delivered from the sampling clock generating circuit 63b so that the reproduction signal is binarized to deliver reproduction data thus obtained to the memory 65.

The memory 65 temporarily stores the reproduction data delivered from the A/D converter 64b to thereby delay the reproduction data by the time corresponding to 135 degrees in terms of the rotational angle of the rotary drum 50 as shown in FIG. 8F to deliver it to the selector switch 66. Namely, unlike the conventional digital VTR in which the reproduction heads are disposed on the rotary drum in a manner opposite to each other by 180 degrees, in this digital VTR, because the angular interval (distance) between the reproduction heads 52a, 52b on the rotary drum 50 is equal to 45 degrees, an approach is employed such that the memory 65 is provided to delay reproduction data reproduced by the succeeding reproduction head 52b in the rotational direction of the rotary drum 50 to allow the time difference between reproduction data of 2 systems delivered to the selector switch 66 to be equal to 180 degrees in terms of the rotational angle of the rotary drum 50 similarly to the conventional digital VTR. In other words, in this digital VTR, the circuits succeeding to the selector switch 66 are permitted to have the same configuration as that of the conventional digital VTR.

The selector switch 66 alternately selects, every one half of rotation of the rotary drum 50, reproduction data from the A/D converter 64a and reproduction data from the memory 65 to deliver the selected reproduction data to the reproduction signal processing circuit 67.

The reproduction signal processing circuit 67 decodes (demodulates) the reproduction data delivered through the selector switch 66 in correspondence with a predetermined signal processing at the recording system 40, and carries out error correction and de-interleaving thereof to separate video data and speech data of 4 channels therefrom. The reproduction signal processing circuit 67 delivers the video data to the D/A converter 68, and delivers respective speech data of the channels #1~#4 to the D/A converters 69a~69d, respectively. The D/A converter 68 converts the video data into an analog signal to output a video signal thus obtained through a terminal 70. Moreover, the D/A converters 69a~69d respectively convert audio data of respective channels into analog signals to output respective speech signals thus obtained through terminals 71a, 71b, 71c, 71d.

The operation of the digital VTR in recording a speech signal of a certain channel in the state where it is inserted in the case of, e.g., editing, etc. will now be described.

In the above-described recording format of the digital VTR, speech signals of the channels #1, #2 of speech signals of 4 channels are recorded into tracks TR1~TR5 after undergone interleaving, and speech signals of channels #3, #4 thereof are recorded into tracks TR6~TR10 after undergone interleaving. For this reason, in the case where only the speech signal of the channel #1 is caused to undergo insert-recording, the speech signal of the remaining channel #2 recorded within the same tracks TR1~TR5 must be left as it is. Accordingly, an approach is employed to send, for a second time, the speech signal of the channel #2 reproduced by the reproduction heads 52a, 52b to the recording system 40 to allow it to be interleaved with a speech signal of the channel #1 delivered through the terminal 42a to record the interleaved speech signals of the channel #1 and the channel #2 into the tracks TR1~TR5 by the recording heads 51a, 51b.

In more practical sense, after the reproduction head 52a starts scanning of, e.g., track TR1, the reproduction head 52b starts scanning of the track TR2 in a manner delayed by the time corresponding to 45 degrees in terms of the rotational angle of the rotary drum 50. These reproduction heads 52a, 52b scan the speech areas 3 of the tracks TR1, TR2 to output reproduction signals corresponding to speech data of which phases are different from each other by 45 degrees in terms of the rotational angle of the rotary drum 50.

The erase head 53 starts scanning of tracks TR1, TR2 in a manner delayed by the time corresponding to 45 degrees in terms of the rotational angle of the rotary drum 50 from the time when the reproduction head 52b starts scanning of the track TR2 to carry out erasing of the signal recorded in the tracking areas 2 and the speech areas 3 of the tracks TR1, TR2. In this instance, e.g., sine wave of single frequency is caused to flow in the erase head 53. Namely, erase current is caused to flow in the erase head 53 after the reproduction heads 52a, 52b have completed scanning of the tracking areas 2 and the speech areas 3. For this reason, there is no possibility that crosstalk of erase current may take place with respect to the reproduction signal corresponding to the tracking signal and the speech data reproduced by the reproduction heads 52a, 52b.

The reproduction signals from the reproduction heads 52a, 52b are converted into reproduction data at A/D converters 64a, 64b. The reproduction data corresponding to the reproduction head 52b of these reproduction data is then delayed by the time corresponding to 135 degrees in terms of the rotational angle of the rotary drum 50 by the memory 65. The reproduction data from the A/D converter 64a and the reproduction data delayed at the memory 65, i.e., reproduction data of which phases are different from each other by the time corresponding to 180 degrees in terms of the rotational angle of the rotary drum 50 are selected one after another by the selector switch 66. The selected reproduction data is delivered to the reproduction signal processing circuit 67.

The reproduction signal processing circuit 67 separates respective speech data of the channels #1, #2 from reproduction data delivered through the selector switch 66.

Here, in the case where speech signal of the channel #1 is inserted, the A/D converter 44a is supplied with the speech signal of the channel #1 through the terminal 42a, and the selector switches 45a, 45b are set so that the selector switch 45a selects speech data of the channel #1 from the A/D converter 44a and the selector switch 45b selects speech data of the channel #2 from the reproduction signal processing circuit 67.

Accordingly, the recording signal processing circuit 46 interleaves new speech data of the channel #1 selected at the selector switch 45a and speech data of the channel #2 selected at the selector switch 45b, and implements a predetermined signal processing such as addition of error correction code, etc. thereafter to respectively carry out time-divisional multiplexing of speech data and tracking signals with respect to the respective recording heads 51a, 51b to generate recording data of which phases are different from each other by the time corresponding to 180 degrees in terms of the rotational angle of the rotary drum 50. The recording signal processing circuit 46 delivers the recording data leading in phase to the memory 47, and delivers the recording data lagging in phase to the recording head 51b as a recording signal through the recording amplifier 48b. The memory 47 delays the recording data leading in phase by the time corresponding to 135 degrees in terms of the rotational angle of the rotary drum 50 to deliver it to the recording head 51a as a recording signal through the recording amplifier 48a. Accordingly, the recording signal is delivered to the recording head 51b in a manner delayed by the time corresponding to 45 (=180−135) degrees in terms of the rotational angle of the rotary drum 50 after the recording signal is delivered to the recording head 51a.

The recording head 51a starts scanning of the track TR1 in a manner delayed by the time corresponding to 45 degrees in terms of rotational angle of the rotary drum 50 from the start of scanning of the erase head 53, and the recording head 51b starts scanning of the track TR2 in a manner further delayed by the time corresponding to 45 degrees in terms of the rotational angle of the rotary drum 50. These recording heads 51a, 51b record recording signals into the tracking areas 2 and the speech areas 3 of respective tracks. Thus, the speech signal of the channel #1 is inserted into the tracks TR1, TR2. By successively repeating the above-described operation with respect to other tracks, insert-recording of the speech signal of the channel #1 is completed.

Meanwhile, since the recording heads 51a, 51b are disposed at the positions respectively succeeding to the reproduction head 52b by 90 degrees and 135 degrees in the rotational direction of the rotary drum 50, scanning of the tracking areas 2 and the speech areas 3 of the reproduction heads 52a, 52b has been already completed at the time point when supply of recording signal with respect to the recording heads 51a, 51b is started. Namely, there is no possibility that crosstalk of the recording signal may take place with respect to the reproduction signal corresponding to the tracking signal and the speech data reproduced by the reproduction heads 52a, 52b.

It is to be noted that, in practice, each reproduction signal reproduced by the reproduction heads 22a, 22b from the magnetic tape 1 is delayed by, e.g., about (1+⅓) frames by the reproduction signal processing circuit 67, etc., and is further delayed by about (1+⅓) frames by the recording signal processing circuit 46, whereby such reproduction signal is recorded onto the magnetic tape 1 in the state delayed by about (2+⅔) frames in total. Moreover, since speech signals of the channels #3, #4 are only reproduced, setting of the selector switches 45c, 45d has not relevancy to the above-described operation. In this example, however, those switches are switched so as to select speech data from the reproduction signal processing circuit 67.

As is clear from the foregoing description, in the digital VTR to which this invention is applied, the recording heads 51a, 51b, the reproduction heads 52a, 52b and the erase head 53 are disposed on the rotary drum 50 so that the recording heads 51a, 51b and the erase head 53 do not scan tracks for a time period during which the reproduction heads 52a, 52b are scanning the tracking areas 2 and the speech areas 3, thereby making it possible to prevent that crosstalk of the recording signal or erase signal may take place in the reproduction signal corresponding to speech data. Thus, insert-recording of speech signal can be securely carried out. In other words, in this digital VTR, there is no degradation of S/N of reproduction signal resulting from crosstalk of recording signal or erase current, and speech signal of a certain channel of plural channels can be insert-recorded.

Further, in this digital VTR, the memory 47 for delaying recording signal to be delivered to the preceding recording head 51a in the rotational direction of the rotary drum 50, and the memory 65 for delaying reproduction signal from the succeeding reproduction head 52b in the rotational direction of the rotary drum 50 are provided, thereby permitting the circuit configuration preceding to the memory 47 and the circuit configuration succeeding to the memory 65 to be the same as the configuration of the conventional digital VTR.

It is to be noted that while explanation has been given in the above-described embodiment in connection with the case where speech signal of channel #1 is insert-recorded, insert-recording may be similarly carried out even in the case where any one of speech signals of channels #2~#4 is insert-recorded.

Moreover, while explanation has been given in the above-described embodiment in connection with the digital VTR including two recording heads and two reproduction heads, it is needless to say that this invention can be applied also to recording and reproducing apparatuses including plural recording heads and plural reproduction heads except for the above. Further, while explanation has been given in connection with the video signal and the speech signal as more practical example in the above-described embodiment, this invention can be applied to equipments for recording/reproducing signals except for the above. In addition, analog signal may be used as a signal to be recorded.

We claim:

1. A recording and reproducing apparatus comprising:
   a reproduction head for reproducing a first signal from first areas of respective tracks on a recording medium, and for reproducing a second signal from second areas succeeding to the first areas of the respective tracks on the recording medium during a single rotation of said recording head;
   an erase head for erasing said first and second signals recorded on the recording medium during said same single rotation of said recording head; and
   a recording head for recording the first signal and the second signal into the respective first and second areas of the respective tracks on the recording medium during said same single rotation of said recording head,
   wherein insert recording is performed during the same single rotation of said recording head by first reproducing the first and second signals from said recording medium by said reproducing head, by next erasing said first and second signals from said recording medium by said erase head, and by next recording one of new, the same, or edited signals in the first and second areas of the respective tracks of the recording medium by said recording head, and wherein the recording head and the reproduction head are disposed so that the recording head does not scan the tracks for a time period during which the reproduction head is scanning the first areas of the tracks.

2. A recording and reproducing apparatus as set forth in claim 1,
   wherein the recording head and the reproduction head are disposed on a rotary drum adapted so that the recording medium is wound thereon, and are disposed at positions spaced to each other by an angle greater than a rotational angle of the rotary drum corresponding to a time period during which all of the first areas of the tracks are scanned by the reproduction head.

3. A recording and reproducing apparatus as set forth in claim 2,
   wherein the recording head and the reproduction head are disposed within the angular range of 180 degrees on the rotary drum.

4. A recording and reproducing apparatus as set forth in claim 3,
   wherein the reproduction head is composed of plural adjacent heads, and
   wherein the apparatus further comprises delay means for delaying a signal reproduced by the succeeding reproduction head in the rotational direction of the rotary drum.

5. A recording and reproducing apparatus as set forth in claim 4,
   wherein the recording head is composed of plural adjacent heads, and
   wherein the apparatus further comprises delay means for delaying a recording signal delivered to the preceding recording head in the rotational direction of the rotary drum.

6. A recording and reproducing apparatus as set forth in claim 3,
   wherein the recording head and the reproduction head are provided within the angular range of one 180 degrees which is one half of round (circumference) of the rotary drum, and are not provided within the angular range of the other 180 degrees.

7. A recording and reproducing apparatus as set forth in claim 1,
   which further comprises an erase head for erasing a signal recorded in the tracks on the recording medium,
   wherein the reproduction head and the erase head are disposed so that the erase head does not scan the tracks for a time period during which the reproduction head is scanning the first areas of the tracks.

8. A recording and reproducing apparatus as set forth in claim 7,
   wherein the reproduction head, the recording head and the erase head are disposed on a rotary drum adapted so that the recording medium is wound thereon, and wherein the reproduction head and the erase head are disposed at positions spaced to each other by an angle greater than a rotational angle of the rotary drum corresponding to a time period during which all of the first areas of the tracks are scanned by the reproduction head.

9. A recording and reproducing apparatus as set forth in claim 1, wherein the first signal is a speech signal, and the second signal is a video signal.

10. A recording and reproducing apparatus as set forth in claim 9, wherein the first signal is a signal in which speech signal of plural channels are multiplexed.

11. A recording and reproducing apparatus as set forth in claim 1, wherein the recording head is supplied with the first signal reproduced by the reproduction head to record the first signal into the first areas of the tracks on the recording medium.

12. A recording and reproducing apparatus as set forth in claim 11, wherein the first signal consists of signals of plural channels.

13. A recording and reproducing apparatus as set forth in claim 1, which further comprises receiving means for receiving an external signal, and selector means for selecting any one of the external signal received by the receiving means and the first signal reproduced by the reproduction head, wherein the recording head is supplied with the signal selected by the selector means to record the selected signal into the first areas of the tracks on the recording medium.

14. A recording and reproducing apparatus as set forth in claim 13, wherein the first signal consists of signals of plural channels, wherein the external signal consists of signals of plural channels, and wherein the selector means selects any one of the signals of the respective channels constituting the first signal and the signals of the respective channels constituting the external signal respectively corresponding to the signals of the respective channels constituting the first signal to output the selected signals to the recording head.

15. The recording and reproducing method, comprising the steps of:

reproducing a first signal from first areas of respective tracks on a recording medium, and reproducing a second signal from second areas succeeding to the first areas of the respective tracks on the recording medium during a single rotation of said recording head;

erasing said first and second signals recorded on the recording medium during the same single rotation of said recording head; and recording one of new, the same, or edited first and second signals to the respective first and second areas of the respective tracks of the recording medium during said same single rotation of the recording head, thereby to perform high speed insert recording, and wherein the recording head and the reproduction head are disposed so that the recording head does not scan the tracks for a time period during which the reproduction head is scanning the first area of the tracks.

* * * * *